:: US008577994B2

(12) United States Patent
Shuster

(10) Patent No.: US 8,577,994 B2
(45) Date of Patent: *Nov. 5, 2013

(54) MANAGEMENT OF BANDWIDTH ALLOCATION IN A NETWORK SERVER

(75) Inventor: Gary Stephen Shuster, Fresno, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,279

(22) Filed: Apr. 26, 2012

(65) Prior Publication Data

US 2012/0215886 A1 Aug. 23, 2012

Related U.S. Application Data

(63) Continuation of application No. 13/161,063, filed on Jun. 15, 2011, now Pat. No. 8,171,113, which is a continuation of application No. 12/881,082, filed on Sep. 13, 2010, now Pat. No. 7,966,416, which is a continuation of application No. 12/114,215, filed on May 2, 2008, now Pat. No. 7,797,408, which is a continuation of application No. 09/837,319, filed on Apr. 18, 2001, now Pat. No. 7,370,110.

(60) Provisional application No. 60/198,491, filed on Apr. 18, 2000.

(51) Int. Cl.
*G06F 15/16* (2006.01)

(52) U.S. Cl.
USPC .......... 709/217; 709/203; 709/223; 709/228; 709/235

(58) Field of Classification Search
USPC .......... 709/200–203, 217–227, 228, 232, 235
See application file for complete search history.

(56) References Cited

U.S. PATENT DOCUMENTS

| | | | | |
|---|---|---|---|---|
| 5,832,232 | A | * | 11/1998 | Danneels ...................... 709/235 |
| 5,850,525 | A | | 12/1998 | Kalkunte et al. |
| 5,854,900 | A | | 12/1998 | Kalkunte et al. |
| 5,896,502 | A | | 4/1999 | Shieh et al. |
| 6,038,215 | A | * | 3/2000 | Uekumasu ..................... 370/235 |
| 6,065,059 | A | | 5/2000 | Shieh et al. |
| 6,078,919 | A | | 6/2000 | Ginzburg et al. |
| 6,147,997 | A | * | 11/2000 | Holden et al. ................ 370/359 |

(Continued)

OTHER PUBLICATIONS

McAuley, Anthony J., "Error Control for Messaging in a Wireless Environment," IEEE INFOCOM, vol. 1, Apr. 1995, pp. 261-268.

(Continued)

*Primary Examiner* — Ramy M Osman

(57) ABSTRACT

A server is configured to transfer information to a plurality of client devices in accordance with bandwidth-limiting and bandwidth-adjustment techniques. Bandwidth may be reduced based on an amount of data previously transferred to a client device (e.g., within a prior time period). Bandwidth may also be reduced based on variable input parameters such as file size, data type, server load, network response time, and number of transfer requests from a client device within a prior period of time. In some embodiments, bandwidth may be reduced by inserting delays between portions of data being transmitted. A length of a delay period may be determined based on the various factors above (amount of previous data transfer(s), file size, etc.). Bandwidth to a client device may also be adjusted dynamically. In some embodiments, bandwidth may be increased (rather than decreased).

20 Claims, 2 Drawing Sheets

(56) References Cited

U.S. PATENT DOCUMENTS

| | | |
|---|---|---|
| 6,275,896 B1 | 8/2001 | Kojima |
| 6,363,076 B1 * | 3/2002 | Allison et al. ............. 370/419 |
| 6,473,793 B1 | 10/2002 | Dillon et al. |
| 6,560,243 B1 | 5/2003 | Mogul |
| 6,600,721 B2 | 7/2003 | Edholm |
| 6,600,737 B1 | 7/2003 | Lai et al. |
| 6,637,031 B1 | 10/2003 | Chou |
| 6,701,372 B2 | 3/2004 | Yano et al. |
| 6,714,986 B2 * | 3/2004 | Karibe et al. ............. 709/240 |
| 7,305,486 B2 * | 12/2007 | Ghose et al. ............. 709/235 |
| 7,370,110 B2 * | 5/2008 | Shuster ............. 709/229 |
| 7,424,730 B2 | 9/2008 | Chou |
| 7,562,130 B2 | 7/2009 | Dillon et al. |
| 7,660,906 B1 * | 2/2010 | Armour ............. 709/231 |
| 7,797,408 B2 | 9/2010 | Shuster |
| 7,945,689 B2 * | 5/2011 | Painter et al. ............. 709/219 |
| 7,966,416 B2 | 6/2011 | Shuster |
| 8,103,786 B2 * | 1/2012 | Chapweske ............. 709/217 |
| 8,171,113 B2 | 5/2012 | Shuster |
| 2004/0049793 A1 | 3/2004 | Chou |
| 2008/0209017 A1 | 8/2008 | Shuster |
| 2011/0010462 A1 | 1/2011 | Shuster |

OTHER PUBLICATIONS

Xomisihapanya, Khammouane, et al., "Improvement of Average Delay Performance in Packet Network by Introducing Intermediate Nodes," IEEE ICOIN, Jan. 1998, pp. 25-28.

* cited by examiner

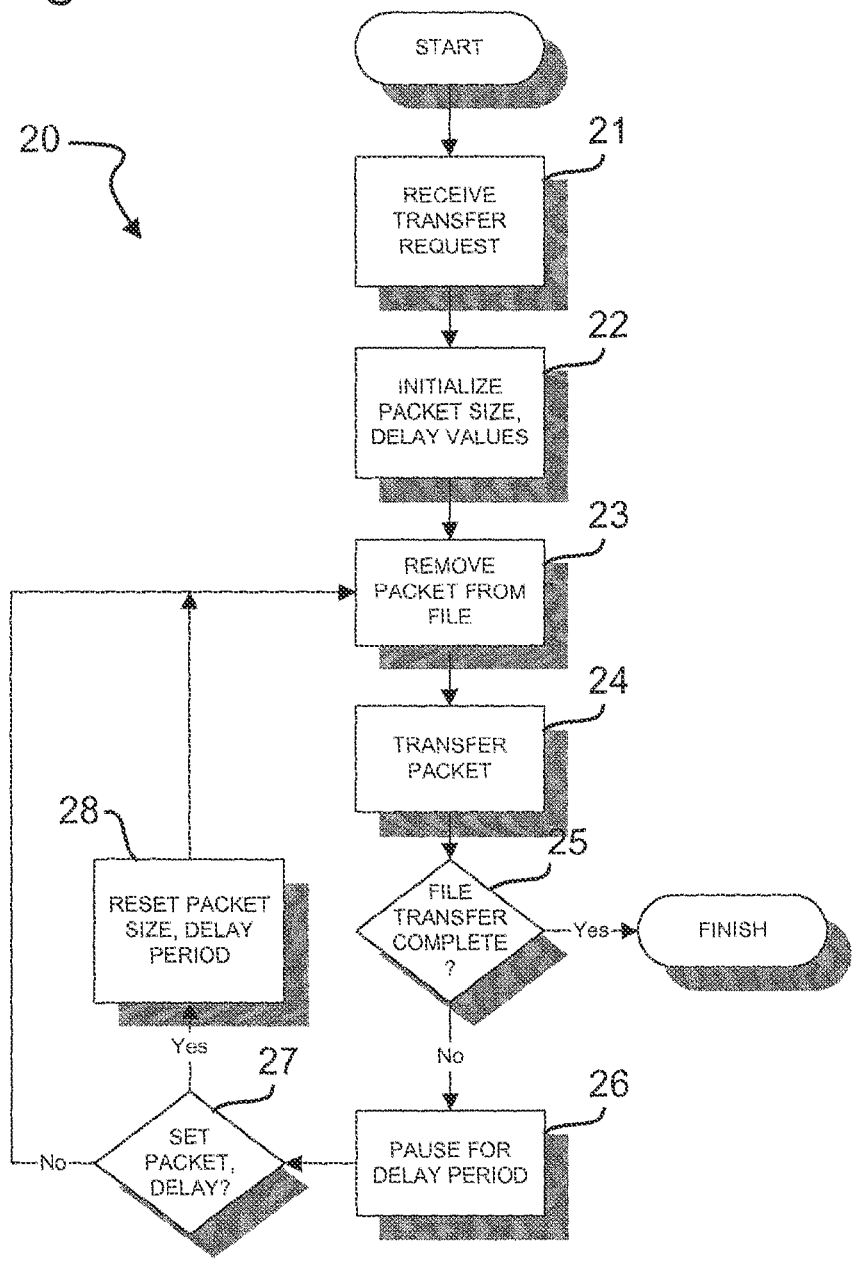

MANAGEMENT OF BANDWIDTH ALLOCATION IN A NETWORK SERVER

CROSS-REFERENCE TO RELATED APPLICATIONS

The present application is a continuation of U.S. application Ser. No. 13/161,063 filed Jun. 15, 2011 (now U.S. Pat. No. 8,171,113), which is a continuation of U.S. application Ser. No. 12/881,082 filed Sep. 13, 2010 (now U.S. Pat. No. 7,966,416), which is a continuation of U.S. application Ser. No. 12/114,215, filed May 2, 2008 (now U.S. Pat. No. 7,797,408), which is a continuation of U.S. application Ser. No. 09/837,319, filed Apr. 18, 2001 (now U.S. Pat. No. 7,370,110) which claims priority to U.S. Provisional Appl. No. 60/198,491, filed Apr. 18, 2000; the disclosures of each of the above-referenced applications are incorporated by reference herein in their entireties.

BACKGROUND OF THE INVENTION

1. Field of the Invention

The present invention relates to methods and systems for operating a server connected to a wide area network, such as the Internet, and particularly to methods of serving files in response to requests from users.

2. Description of the Related Art

Publicly accessible servers, particular servers that provide storage space for no charge, such as servers on free web hosts, are often used inappropriately in violation of agreed terms of service for the distribution of media files such as large software, music, and video files. Such media files tend to be much larger than the files that the host service is intended for. Consequently, the storage and exchange of these inappropriate files demands greater bandwidth than more appropriate uses, thereby choking and discouraging the uses that the web server is intended to serve. Additionally, these types of media files often contain illegally copied content, that may lend an undesirable taint to operators of web hosting services who do not wish to be perceived as encouraging copyright violations. Another injury caused by such inappropriate use is disproportionately heavy use of the server by relatively few users, thereby reducing the number of subscribers that the hosting service attracts. A related problem is the devaluation of advertising space as a result of people downloading such files, and the potential for alienating advertisers who have purchased advertising space on the servers serving such files.

Therefore, a method and system is needed to discourage inappropriate use of publicly available, network-connected server space, without adversely affecting intended uses of the server space or restricting public access. The method and system should integrate seamlessly and cost-effectively with existing network protocols and server software and hardware.

SUMMARY OF THE INVENTION

A method and system for operating a network server are provided, whereby the rate at which files are served from the server storage device to public users on the network depends primarily on the file size, and secondarily on other parameters, such as server load and file type. In particular, the transfer rate of each requested file is controlled and varied during transfer of the file. The method is particularly suitable for application to every file transferred from the server. In the alternative, the method may be applied only to selected files or types of files. In an embodiment of the invention, the transfer rate is progressively slowed (decelerated) as each file is transferred from or to the network. Consequently, relatively small files are not noticeably delayed, while very large files may be very substantially delayed relative to the rate at which they would be transferred without implementation of the invention. The delaying action serves to preserve system bandwidth for transfer of smaller files, and further discourages users from requesting the transfer of large files, thereby preserving system bandwidth to an even greater degree. The response of the server to appropriate uses can be greatly improved at the same time system performance is deliberately degraded for inappropriate uses. Furthermore, the method is easy to implement in a variety of different systems while adding minimal system overhead.

According to an embodiment of the invention, the server is connected through a network, such as the Internet, to a plurality of client devices, and is configured to transfer information between any selected one of the client devices and a memory for static storage of information. The method comprises the steps of receiving a request to transfer a file between the memory and one of the plurality of client devices, removing a packet comprising a defined number of information bits from the file, transferring the packet between the memory and the client device per the request, then pausing for a defined delay period, and repeating the removing, transferring, and pausing steps in order until all of the file has been transferred. Preferably, the method further comprises increasing the defined delay period after each execution of a packet transfer cycle (or after a selected number of cycles), thereby discouraging the transfer of unacceptably large files. The delay period may be initiated, and the amount of increase or other adjustment to the delay period during the transfer cycle may be controlled, by selected a predetermined value from a table, or by calculating a value based on variable input parameters such as the file size, server load, network response time, and number of transfer requests from the client device within a defined prior period. The number of information bits in the packet—that is, the packet size—may have a value that is similarly initiated and adjusted during the transfer cycle. According to a related embodiment of the invention, a system comprises a server having an application that performs one of the embodiments of the method according to the invention.

A more complete understanding of the method and system for operating a network server to discourage inappropriate use will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 is a flow diagram showing exemplary steps for performing a method according to the invention.

DETAILED DESCRIPTION OF THE PREFERRED EMBODIMENT

Figure 1:
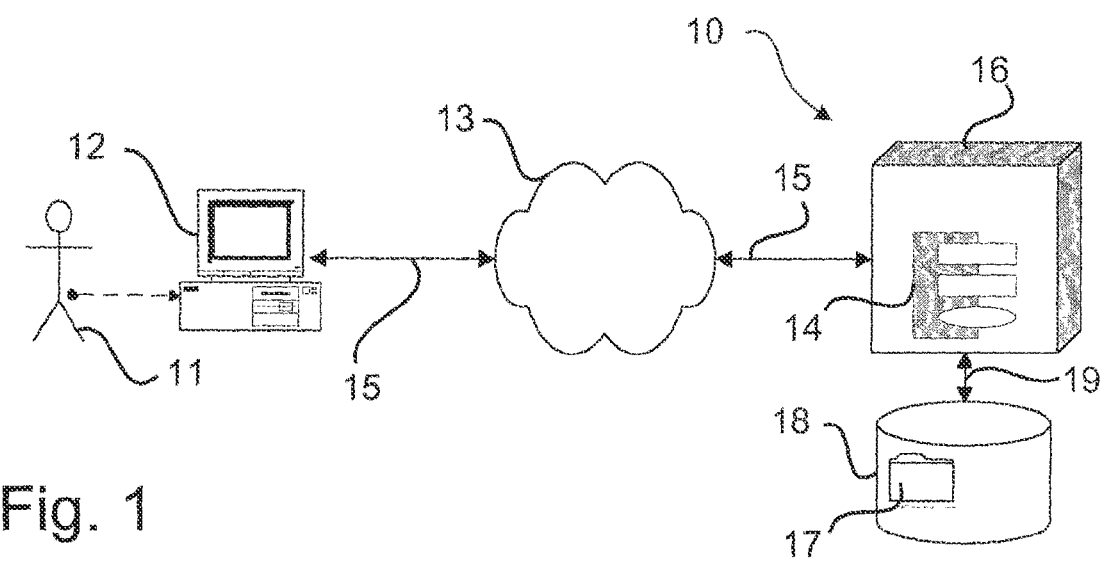
FIG. 1 is a system diagram showing an exemplary system for implementing a method according to the invention, and its relationship to other elements.

The present invention provides a method and system operable at an application or higher network level for discouraging inappropriate use of network resources. In the detailed description that follows, like element numerals are used to describe like elements shown in one or more of the figures.

Referring to FIG. 1, system 10 comprises a server 16 and an application 14 executing on the server. Server 16 is typically a general purpose computer configured for serving information to multiple users across a network, but may comprise any high-level computing device capable of performing the method described herein. Application 14 comprises a program of instructions for performing the method described herein, and may additionally comprise instructions for performing other server functions as known in the art.

Server 16 is connected to network 13 by communication link 15 and to a memory 18 containing at least one file 17. Memory 18 is any device, such as a hard drive or array of hard drives, tape drive, optical disk drive, or similar device, for static storage of information; and particularly, devices capable of accessing and storing massive amounts of high-level data for indefinite periods. In an embodiment of the invention, memory 18 is physically adjacent to server 16 and connected to the server through a server-operated bus 19. Server 10 controls access by users, such as user 11 connected to network 13, to memory 18. File 17 is a set of high-level data encoded in a finite number of discrete information bits, such as binary bits. A plurality of files such as file 17 are used to exchange high-level information between a plurality of users, such as user 11, connected to network 13 using client devices such as terminal 12 and a communication link 15.

Network 13 may be a wide area network, a local area network, or a combination of different types of networks, such as the Internet. The network may be operated by various protocols, such as TCP/IP. The system and method according to the invention are not limited to application with any particular type of type of network, protocol, or client device. Although one skilled in the art will recognize that the invention is readily implemented for use with packet-switching networks, such as the Internet, it should also be appreciated that the invention is not limited thereby. The invention provides a method for implementation at a high system level. Therefore, the details of lower-level systems, such as network architecture and protocols, are secondary considerations for adapting the invention to be addressed in specific cases by one skilled in the art.

Referring to FIG. 2, exemplary steps of a method 20 for discouraging inappropriate use of memory connected to a network are shown. Method 20 may be implemented by a background application, and is preferably applied to all public requests for file transfers from the memory. In an alternative embodiment, the method is applied to files of a selected type, such as MP3 files. However, file types are generally easily disguised, so the foregoing embodiment may suffer from the disadvantage of being easily circumvented. Operation of method 20 is triggered by the receipt of a public request for a file transfer at step 21. As used herein, "transfer" includes both the transmission of a file from a public memory to a client device, and storage in the public memory of a file received from a client device. Method 20 may be applied to both types of transfers, but is believed to be especially useful for application to transmission of files from network-accessible memory to client devices.

At step 22, packet size and delay period values are initialized. The initial packet size and delay period values may be constants that are retrieved from a system memory, or may be variables that are calculated or selected from a table of predetermined values depending on variable parameters such as the size of the requested file, the load experienced by the server, the network response time, or the number and/or size of transfer requests from the requesting client device within a defined time period. The initial delay value is preferably a unit of time, such as one millisecond. The initial packet size is preferably a defined number of information bits, which is substantially smaller than the size of files that are considered undesirable to transfer. In an embodiment of the invention, the packet size is preferably the same as or larger than the typical packet size of the transmission control protocol in use on the network over which the file will be transferred, such as, for example, 8192 (8 k) bytes. It should be apparent that the packets used in method 20 are distinct from and reside at a higher level than "packets" as the term is used in the art in connection with packet-switched communication methods.

At step 23, a packet of information having the defined size is removed from the file requested for transfer. As used herein, to "remove" a packet does not necessarily imply actual removal of information from the file, or actual segmentation of the file into co-existing, separate packets. Such techniques may be used, but are not generally preferred because they may entail destruction of the file and/or inefficient programming. Rather, a packet is preferably removed by copying a defined portion of the file into a working memory in the server and recording the sequence number, packet size, and any other information required to identify the next packet in the sequence and/or to reassemble the file from the separately transferred packets. Depending on the desired transfer technique, such identifying information may be included in a packet header or footer. If the remaining portion of the file (i.e., that portion that has not yet been removed and transferred) is less than the packet size, then the packet comprises the entire remaining portion of the file, and a flag for application 14 is set to indicate that the end of the file has been reached.

At step 24, the packet is transferred in accordance with the client request. Where the file is to be transferred over a network, whatever packeting technique is used at step 23 is preferably designed so that transmission of the file as a sequence of high-level packets is seamlessly integrated with the transfer protocol, and no client-side special application is needed to reassemble the file. In addition, high-level, server side delays attributable to method 20 are preferably made indistinguishable from transmission delays caused by bandwidth constraints at the server or at lower layers in the network. In this way, operation of method 20 is made invisible to users of the system. In the alternative, but less preferably, a distributable client-side application for re-assembling the high-level packets into a file may be distributed to the client in advance of the file transfer, where it may be triggered upon receipt of the first top-level file packet.

At step 26, a pause is introduced having a duration determined by the defined delay period. During the pause, no top-level server-side activity is performed that is directed towards the transfer of the requested file, although lower-level activity and client-side activity for transfer of the file preferably can and does occur irrespective of the pause. Of course, after the last packet in the file is transferred, a pause serves no function and the routine terminates as indicated at branch 25.

At optional step 28, the delay period and/or the packet size are set to adjusted values. If both parameters are to remain constant for the next execution cycle, step 28 is bypassed as indicated at branch 27, and the transfer cycle is re-entered at step 23. However, during at least selected ones of the execution cycles, at least one of the packet size or the delay period is preferably set to an adjusted value at step 28. For example, it is generally preferable to increase the delay period after selected execution cycles, such as after each execution cycle. File transfer rates may also be adjusted and controlled by changing the packet size after each of, or selected ones of, the execution cycles. For example, decreasing the packet size parameter after each cycle while holding the delay period constant will cause the transfer rate to decelerate similarly to what may be achieved by holding the packet size constant and increasing the delay period. However, use of the delay period as the rate control parameter will typically be more easily and more efficiently implemented at the application level. Therefore, it is generally preferred to hold the packet size constant and adjust the delay period, but the scope of the invention is not limited thereby. Furthermore, to achieve the desired result, an appropriately timed delay may be inserted after randomly chosen packets wherein each packet has a set probability of being selected for delay. Thus, a delay need not necessarily be inserted after every packet, or even after every "nth" packet.

Various different algorithms may be employed to calculate the value to which the delay period and/or packet size parameters will be set at step 28. In the alternative, a predetermined value may be selected from a lookup table depending on various input criteria. A desirable result can be achieved using a compact calculation scheme. For example, in an embodiment of the invention, the delay period is increased after selected cycles (such as after each cycle) by adding a constant increment, such as an additional millisecond. If desired, greater rates of deceleration may be achieved by increasing the incremental delay amount as the transfer progresses, such as by a fixed percentage (for example, 2%) after each cycle.

In the alternative, the delay period (or packet size) value set at step 28 may be calculated independently of the delay period (or packet size) value used in the previous cycle, or calculated using at least one independent variable. For example, delay period value can be set as a function of the server load, file size, network response time, or number of transfer requests or quantity of bytes requested from the requesting client device or port within a defined prior period. The latter parameter allows for targeting delays to particular ports or clients. In an alternative embodiment, if the server load is very low and excess capacity is available, the delay period can be set to zero, thereby permitting both large and small files to be transferred without delay. This may be useful for applications where it is desirable to permit large file transfers under limited circumstances. As server load increases, any of the initial delay period, the rate of increase in the delay period, and/or the value of the delay period after each cycle or a selected number of cycles, can be set to a non-zero value that is determined as a function of load on the server.

After execution of step 28 (or after step 28 is bypassed at branch 27), the transfer cycle is re-entered at step 23, and steps 23, 24, 26 (and optionally, step 28) are repeated in sequence until all of the file requested for transfer has been transferred. When file transfer is complete, the execution loop terminates as indicated at branch 25.

Method 20 is preferably configured as one or more modules that can be called as needed, and configured so that separate instances of each module may run concurrently without conflict. Accordingly, a server making use of method 20 is preferably capable of transferring multiple files in parallel. It should be apparent that the pauses inserted by method 20 may in some cases enhance such parallel operation, by freeing processor time available for execution of parallel steps.

The following example illustrates the operation of method 20 in a network-connected system 10. Referring again to FIG. 1, server 16 and terminal 12 are connected via communication links 15 to network 13. User 11 sends a request for file 17 to server 16. Server 16 is open to file requests from any and all users, and application 14 is applied to filter or screen all requests for files. For this example, application 14 is configured so that the initial delay period "t" is one millisecond, and the initial packet size "P" is ten kilobytes (it should be understood that 8 kilobytes would be a more typical implementation, and ten kilobytes is merely convenient choice for illustrative purposes). Therefore, after receiving the request, application 14 transmits the first ten kilobytes of file 17 to terminal 12. Application 14 then pauses for one millisecond, and then transmits the next ten kilobytes of file 17 to terminal 12. Application 14 then increments the delay period by an additional one millisecond, pauses for the adjusted delay period (now two milliseconds) and transmits the next ten milliseconds of file 17. Application 14 repeats the foregoing cycle, incrementing the delay period by an additional millisecond after each transmission, until the entire file 17 has been transferred to terminal 12.

It should be apparent that the total delay time "T" inserted by method 20 for file 17 may be computed by summing the individual delay periods; that is, "T=.sub..SIGMA.t." The size "n" of file 17 may be expressed as an integer number of packets, determined by "n=F/P," where n is rounded up to the next integer, and "F" and "P" are the size of file 17 and the packet size, respectively, in compatible units such as bytes or bits. For the forgoing example, the sequence of delay periods comprises an arithmetic progression of integer millisecond values from 1 to (n−1). Therefore, the total delay time in milliseconds for a given file of size "F" will be:

$$T=n(n-1)2=(F/P)2-(F/P)2. \qquad \text{Eq. 1}$$

Accordingly, user 11 will experience, for example, in addition to any usual transmission delays associated with network and system capacity, an unnoticeable additional delay of 45 milliseconds in transferring a 100 kilobyte file; a slight additional delay of 4.95 seconds in transferring a one megabyte file; a substantial additional delay of 8 minutes and 19 seconds in transferring a ten megabyte file, and a probably intolerable additional delay of 208 hours in transferring a fifty megabyte file. A desirable user will perceive that the system is fast, because the transfers of small files (such as web pages) proceed without noticeable delay. However, a user seeking to use server 16 to store and transfer large files, such as music or video files, will be discouraged by the large additional delay times, and will therefore avoid using the server for such purposes. At the same time, server 16 remains freely available on an open and equal basis to all users, thereby helping to attract traffic to the site.

Having thus described a preferred embodiment of the method and system for operating a network server to discourage inappropriate use, it should be apparent to those skilled in the art that certain advantages of the within system have been achieved. It should also be appreciated that various modifications, adaptations, and alternative embodiments thereof may be made within the scope and spirit of the present invention. For example, the use of a particular rate-modifying algorithm has been illustrated, but it should be apparent that the inventive concepts described above would be equally adaptable for use with other algorithms for controlling the file transfer rate. For further example, a system comprising a server has been illustrated, but it should be apparent that the inventive concepts described above would be equally adaptable for use with other devices for transferring information across a network, such as routers. The invention is further defined by the following claims.

What is claimed is:

1. A method, comprising:
receiving, at a first computer system, information indicating a request to transfer data to a second computer system;

the first computer system determining a quantity of other data previously transferred to the second computer system; and in response to said determining, the first computer system throttling transfer of the data to the second computer system, wherein the throttling is based at least in part on the determined quantity of other data previously transferred to the second computer system and comprises:

transmitting, to the second computer system, a first portion of the requested data at a first effective rate; and determining to delay a transmission of a second, subsequent portion of the requested data to the second computer system in order to cause the second portion to be transmitted to the second computer system at a second effective rate that is slower than the first effective rate.

2. The method of claim 1, wherein said throttling comprises:

causing a portion of the data to be transmitted to the second computer system;

determining a length of a delay period associated with transmission of an additional portion of the data; and causing the additional portion of the data to be transmitted to the second computer system after the delay period has occurred.

3. The method of claim 2, further comprising:
determining a length of an additional delay period; and
causing a further portion of the data to be transmitted to the second computer system after the additional delay period has occurred, wherein the length of the additional delay period is different from the length of the delay period.

4. The method of claim 1, wherein the request to transfer data specifies a particular data file.

5. The method of claim 1, further comprising:
determining a length of a delay period based on a type of the data;
wherein said throttling includes temporarily halting a transmission, for at least the length of the delay period, of the data to the second computer system.

6. The method of claim 1, wherein data packets are used to transfer the data to the second computer system; and wherein determining the quantity of other data previously transferred to the second computer system is based, at least in part, on data transferred during a defined prior period of time.

7. The method of claim 1, wherein said throttling includes lowering an effective bandwidth rate based, at least in part, on a file size associated with the request to transfer data.

8. A computer-readable memory having instructions stored thereon that are executable by a first computer system to cause the first computer system to perform operations comprising:

receiving, at the first computer system, information indicating a request to transfer data to a second computer system;

determining a quantity of other data previously transferred to the second computer system; and in response to said determining, causing transfer of the data to the second computer system to be throttled, wherein the throttling is based at least in part on the determined quantity of other data previously transferred to the second computer system and comprises:

transmitting a first portion of the requested data to the second computer system at a first effective rate; and determining to delay transmission of a second, subsequent portion of the requested data to the second computer system in order to cause the second portion to be transmitted to the second computer system at a second effective rate that is slower than the first effective rate.

9. The computer-readable memory of claim 8, wherein the operations further comprise:

determining a length of a delay period; and wherein causing the transfer of the data to the second computer system to be throttled includes halting a transmission of the data for at least the length of the delay period.

10. The computer-readable memory of claim 9, wherein the length of the delay period is a pre-specified value.

11. The computer-readable memory of claim 9, wherein the length of the delay period is based, at least in part, on an available bandwidth associated with the first computer system.

12. The computer-readable memory of claim 8, wherein causing the transfer of the data to the second computer system to be throttled includes inserting a plurality of delays between respective ones of a plurality of groups of one or more data packets until all of the data has been transmitted to the second computer system, wherein successive ones of the plurality of delays are equal to or longer than earlier ones of the plurality of delays.

13. The computer-readable memory of claim 8, wherein the request to transfer data to the second computer system is a request for a file hosted by a server running on the first computer system.

14. The computer-readable memory of claim 8, wherein determining the quantity of other data previously transmitted to the second computer system is based, at least in part, on network identification information associated with the second computer system.

15. The computer-readable memory of claim 8, wherein causing the transfer of the data to the second computer system to be throttled is based, at least in part, on the quantity of other data previously transmitted to the second computer system being greater than a threshold amount of data.

16. A computer system, comprising:
a processor; and
a storage device having instructions stored thereon that are executable by the processor to cause the computer system to perform operations comprising:

receiving information indicating a request to transfer data to a specified network address;

causing a portion of the data to be transmitted to the specified network address at a first effective rate;

determining a length of a delay period associated with a transmission of an additional portion of the data to the specified network address, wherein the length of the delay period is based at least in part on a quantity of other data previously transferred to the specified network address and is also calculated in order to achieve a second effective rate for transmittal to the specified network address that is slower than the first effective rate; and causing the additional portion of the data to be transmitted to the specified network address after the delay period has occurred, said transmitting occuring at the second effective rate.

17. The computer system of claim 16, wherein the computer system is configured to route data packets between two or more networks.

18. The computer system of claim 16, wherein the operations further comprise:

determining a length of an additional delay period; and causing a further portion of the data to be transmitted to the specified network address after the additional delay period has occurred.

19. The computer system of claim 18, wherein the length of the additional delay period is less than the length of the delay period.

20. The computer system of claim 16, wherein determining the length of the delay period is based, at least in part, on a type of the data.

* * * * *

UNITED STATES PATENT AND TRADEMARK OFFICE
CERTIFICATE OF CORRECTION

PATENT NO. : 8,577,994 B2  
APPLICATION NO. : 13/457279  
DATED : November 5, 2013  
INVENTOR(S) : Shuster Page 1 of 1

It is certified that error appears in the above-identified patent and that said Letters Patent is hereby corrected as shown below:

In the Specification

In Column 2, Line 61, delete "EMBODIMENT" and insert -- EMBODIMENTS --, therefor.

In Column 3, Line 19, delete "Server 10" and insert -- Server 16 --, therefor.

Signed and Sealed this
Twenty-ninth Day of July, 2014

Michelle K. Lee
*Deputy Director of the United States Patent and Trademark Office*